(12) United States Patent
Lehmann et al.

(10) Patent No.: US 10,406,757 B2
(45) Date of Patent: Sep. 10, 2019

(54) METHOD OF ANCHORING A FIRST OBJECT IN A SECOND OBJECT

(71) Applicants: Woodwelding AG, Stansstad (CH); Inter IKEA Systems B.V., Delft (NL)

(72) Inventors: Mario Lehmann, Les Pommerats (CH); Jörg Mayer, Niederlenz (CH); Marcel Aeschlimann, Ligerz (CH); Laurent Torriani, Lamboing (CH); Muthumariappan Sankaran, Älmhult (SE); Håkan Käll, Älmhult (SE)

(73) Assignees: WOODWELDING AG, Stansstad (CH); INTER IKEA SYSTEMS B.V., Delft (NL)

( * ) Notice: Subject to any disclaimer, the term of this patent is extended or adjusted under 35 U.S.C. 154(b) by 214 days.

(21) Appl. No.: 15/517,007

(22) PCT Filed: Oct. 2, 2015

(86) PCT No.: PCT/CH2015/000151
§ 371 (c)(1),
(2) Date: Apr. 5, 2017

(87) PCT Pub. No.: WO2016/054752
PCT Pub. Date: Apr. 14, 2016

(65) Prior Publication Data
US 2017/0305073 A1    Oct. 26, 2017

(30) Foreign Application Priority Data
Oct. 9, 2014  (CH) ........................................ 1539/14

(51) Int. Cl.
*B32B 37/00*   (2006.01)
*B29C 65/00*   (2006.01)
(Continued)

(52) U.S. Cl.
CPC .......... *B29C 66/3032* (2013.01); *B29C 65/08* (2013.01); *B29C 65/565* (2013.01);
(Continued)

(58) Field of Classification Search
CPC ..... B29C 65/08; B29C 65/565; B29C 65/603; B29C 65/609; B29C 65/645;
(Continued)

(56) References Cited

U.S. PATENT DOCUMENTS 3,499,808 A * 3/1970 Obeda ..................... B29C 65/08
                                                    156/580.2
4,312,077 A * 1/1982 Petersson ............... A41H 37/10
                                                    156/160
(Continued)

FOREIGN PATENT DOCUMENTS

FR    2 472 351    7/1981
JP    5-245941    9/1993
(Continued)

OTHER PUBLICATIONS

International Preliminary Report on Patentability dated Apr. 11, 2017 (Apr. 11, 2017), Application No. PCT/CH2015/000151, 11 pages.

*Primary Examiner* — James D Sells
(74) *Attorney, Agent, or Firm* — Rankin, Hill & Clark LLP (57) ABSTRACT

A first object is anchored in a second object. The first object has a material with thermoplastic properties, and the second material has a material that is solid and is penetrable by the first material when in a liquefied state. The second object has an insertion face with an opening having a mouth in the insertion face, and the first object has an insert portion that for anchoring is placed in the opening or about the mouth thereof. For anchoring, energy suitable for liquefaction of (Continued)

the first material impinges in an amount and for a time sufficient for at least partial liquefaction of the first material and interpenetration of the first and second materials. The second object, around the opening, has an anisotropic strength with respect to forces perpendicular to the opening axis.

35 Claims, 5 Drawing Sheets

(51) Int. Cl.
| | |
|---|---|
| B29C 65/08 | (2006.01) |
| B29C 65/60 | (2006.01) |
| B29C 65/64 | (2006.01) |
| B29C 65/78 | (2006.01) |
| B29C 65/56 | (2006.01) |
| B29K 101/12 | (2006.01) |

(52) U.S. Cl.
CPC .......... *B29C 65/603* (2013.01); *B29C 65/609* (2013.01); *B29C 65/645* (2013.01); *B29C 65/7808* (2013.01); *B29C 65/7844* (2013.01); *B29C 66/30321* (2013.01); *B29C 66/30325* (2013.01); *B29C 66/474* (2013.01); *B29C 66/727* (2013.01); *B29C 66/7392* (2013.01); *B29C 66/74* (2013.01); *B29C 66/7487* (2013.01); *B29C 66/8145* (2013.01); *B29C 66/81429* (2013.01); *B29C 66/9231* (2013.01); *B29C 66/9261* (2013.01); *B29C 66/71* (2013.01); *B29C 66/73161* (2013.01); *B29K 2101/12* (2013.01)

(58) Field of Classification Search
CPC ............ B29C 65/7808; B29C 65/7844; B29C 66/30321; B29C 66/30325; B29C 66/474; B29C 66/727; B29C 66/7392; B29C 66/74; B29C 66/7487
USPC ........................................................ 156/73.1
See application file for complete search history.

(56) References Cited

U.S. PATENT DOCUMENTS

| | | |
|---|---|---|
| 4,865,680 A | 9/1989 | Pierson |
| 2003/0062110 A1 | 4/2003 | Urlaub et al. |

FOREIGN PATENT DOCUMENTS

| | | |
|---|---|---|
| WO | 96/01377 | 1/1996 |
| WO | 98/42988 | 10/1998 |
| WO | 2004/017857 | 3/2004 |
| WO | 2006/002569 | 1/2006 |
| WO | 2008/080238 | 7/2008 |
| WO | 2008/080239 | 7/2008 |
| WO | 2010/072009 | 7/2010 |
| WO | 2012/037697 | 3/2012 |
| WO | 2013/104422 | 7/2013 |
| WO | 2015/181300 | 12/2015 |
| WO | 2015/181301 | 12/2015 |

\* cited by examiner

METHOD OF ANCHORING A FIRST OBJECT IN A SECOND OBJECT

BACKGROUND OF THE INVENTION

Field of the Invention

The invention is in the field of mechanical engineering and construction and concerns a method for joining two objects. A first one of the object includes an insert portion and the other object includes an opening, and, for the two objects to be joined, the insert portion is anchored in the opening, wherein one of the objects includes a solid material having thermoplastic properties, and the other object includes a solid material that is penetrable by the material having thermoplastic properties when liquefied.

Description of Related Art

From e.g. the publications WO 96/01377 (Createc), WO 98/042988 (Woodwelding) and WO 2006/002569 (Woodwelding) or WO 2008/080238 (Woodwelding) a first approach is known to anchor inserts including materials having thermoplastic properties in fibrous or porous materials such as, e.g., chipboard or wood. For such anchoring, the insert is positioned relative to the opening, and then mechanical vibration, in particular ultrasonic vibration, and a force directed for pressing the insert into the opening are simultaneously applied to the insert. In the step of positioning the insert, no relevant force is used, i.e., on application of the vibratory energy, the positioned insert will vibrate freely, or will, due to the named force pressing it against the fibrous or porous material, transmit the vibratory energy to the latter. In the step of applying vibration and force, the material having thermoplastic properties is liquefied due to friction heat at least where the thermoplastic material is in contact with the fibrous or porous material and it penetrates into the fibrous or porous material via the walls of the opening and forms on re-solidification a connection with the porous or fibrous material.

According to a second, alternative approach, for example disclosed in PCT/EP2015/061853, the second object (including a second material penetrable by a thermoplastic material) may be chosen to include an opening and the first object (including a first material being a solid material having thermoplastic properties) to include an insert portion, wherein the opening and the insert portion are adapted to each other for the insert portion to be positioned in the opening with an interference fit. In this, the first and second materials constitute at least part of opposite surface areas of insert portion and opening pressed against each other in the interference fit. The interference fit may then be established by placing the insert portion in the opening and applying an interference force, and only thereafter, the insert portion is anchored in the opening by transferring energy suitable for liquefaction of the first material to the vicinity of the opposite surface areas in an amount and for a time sufficient, for liquefaction of the first material and interpenetration of the first and second materials in the vicinity of the opposite surface areas and stopping the transfer of energy for a time sufficient for the first material liquefied during the step of anchoring to re-solidify. The energy may be mechanical vibration energy, in particular ultrasonic vibration.

Especially in the second, alternative approach (with establishing an interference fit prior to the anchoring step) but also in certain embodiments of the first approach in which during the step of applying vibration and force, for example described in WO 2008/080239, a slightly oversized portion of the insert is pressed into the opening, the second object may be subject to a considerable mechanical load. Depending on the composition of the penetrable material or possibly other materials of the second object, there may be a risk of cracks or other damages (such as portions flaking off) being caused by the introduction of the insert portion into the opening prior to the step of anchoring because the insert portion will tend to expand the width of the opening in the second object.

SUMMARY OF THE INVENTION

The object of the present invention is to provide a method for joining two objects based on the above-mentioned first or second approach where the risk of damages to the second object caused by inserting the insert portion in the opening of the second object if the insert portion has a slightly oversized cross section is minimized.

According to an aspect of the invention, a method of anchoring a first object in a second object is provided, the method including the steps of:

providing the first object including a first material and providing the second object including a second material, wherein the first material is solid and includes thermoplastic properties and wherein the second material is solid and is penetrable by the first material when in a liquefied state, the second object having an insertion face, wherein the second object includes an opening having a mouth in the insertion face, the opening having an opening axis, wherein the second object, around the opening, has an anisotropic strength with respect to forces perpendicular to the opening axis, and the first object further including an insert portion, placing the first object relative to the second object so that the insert portion reaches into the opening or is placed about the mouth thereof, anchoring the insert portion of the first object in the opening by transferring energy suitable for liquefaction of the first material to the first object in an amount and for a time sufficient, for at least partial liquefaction of the first material and interpenetration of the first and second materials in the vicinity of the opposite surface areas;

stopping the transfer of energy for a time sufficient for the first material liquefied during the step of anchoring to re-solidify, wherein a cross section of the opening perpendicular to the opening axis and a cross section and orientation of the insert portion are adapted to each other so that the first and second materials constitute at least part of opposite surface areas of insert portion and opening pressed against each other by a pressing force that varies around the circumference of the opening when the insert portion is inserted (which pressing force typically acts in directions perpendicular to the insertion axis), wherein the pressing force between the opposite surface areas acting in a first direction of smaller strength of the second object is smaller than the pressing force acting in a second direction, of larger strength.

The second object may for example have a section with a broad surface, with the insertion face being at an angle—for example at a right angle or at another angle, for example 45°—to the broad surface. Then, the first direction may be a direction perpendicular to the broad surface and the second direction may be a direction parallel to the broad surface.

A possible condition, for example, may be that the opening is closer to the broad surface than to any side surface. A side surface in this may be defined to be a surface that is at an angle to both, the broad surface and the insertion face, usually with an extension in one direction being considerably smaller than the extensions of the broad surface.

Especially, the section of the second object may be a board shaped section defining two, typically parallel, broad surfaces, the insertion face being a narrow side face between the two broad surfaces. The angle between the broad surface and the insertion face may for example be about 90°; other angles, for example 45°, are not excluded.

Generally, the insertion face may be a face of an object that meets another surface of the object at a common edge. The direction of smaller strength will then often be the direction to the point where the opening comes closest to the edge.

In an example, the insertion face need not be a narrow side face of a board shaped object. In an embodiment, the insertion face may also be a face of an object with a square cross section, with the opening being arranged close to another face that is at an angle to the insertion face and meets the insertion face at a common edge. The strength will then be particularly small in the direction towards the point where the opening comes close to this edge, because material strength remaining between the opening and the other face is particularly low there.

Other reasons for there being a direction of smaller strength may be material inhomogeneity of the second object or the anisotropy that results from the insertion face being at a non-perpendicular angle to two broad surfaces, for example for forming a mitre joint.

This approach according to the invention may at first seem somewhat counter-intuitive, because it may lead to a more pronounced anchoring of the insert portion along sideways (in-plane) directions, whereas often in furniture industry and other industries mechanical loads are expected to act in directions perpendicular to the broad surfaces. However, it has been found that the approach according to the invention enhances the strength of the anchoring, also with respect to forces acting parallel to the direction of smaller strength, i.e., if applicable, perpendicular to the broad surface.

A main reason for this is that it has been found that the risk of damages such as cracks or portions flaking off, if the second object is board shaped and if the opening is in the narrow side face, is particularly high in directions perpendicular to the board plane (the broad surface plane); i.e., the second object material tends to give way in directions perpendicular to the broad surface plane, so that cracks approximately parallel to the broad surface plane are generated. It has also been found that this kind of damages—apart from possible aesthetical disadvantages—also has an adverse effect on the anchoring strength. Due to the approach according to the invention, however, the mechanical load upon insertion/anchoring of the insert portion is reduced in the first directions, and the tendency of damages to occur is substantially reduced. Thus, the approach of the invention reduces both, the risk of cracks and of visible bulges of the second object. Furthermore, since the pressing force is lower in that direction, i.e. the first direction, in which the second object, e.g. the board, has its lowest mechanical strength, the internal structure of the board is not deteriorated.

In embodiments, the cross section of the insert portion is oversized compared to the cross section of the opening in at least one axial depth in at least one radial direction. More in particular, in such embodiments, the cross section is oversized with respect to the opening along in-plane directions (referring to the plane of the broad surface) i.e. in the second direction. According to a possibility, the cross section is oversized with respect to the opening along in-plane directions whereas it is not oversized or oversized to a lesser extent along out-of-plane directions, i.e., in the first direction.

Because in these embodiments the cross section of the insert portion is oversized in at least one axial depth in at least one radial direction, it may be (depending on how much it is oversized) adapted to the opening for an interference fit if it is inserted into the opening while still being dimensionally stable (i.e., the material is not yet made liquefiable). This does not necessarily imply that an interference fit is indeed established.

In embodiments, the insert portion may have the property of being asymmetric with respect to rotations of 90° about the opening axis. More in particular, the insert portion may have, in cross section perpendicular to the insertion axis (the axis of the opening axis when the first object is inserted) a major axis and a minor axis, wherein at least one of the following conditions is fulfilled:

The insert portion has a larger extension along the major axis than along the minor axis. For example, the insert portion may be elliptical or approximately rectangular with rounded edges.

The stiffness (mechanical resistance against (elastic and/or plastic) deformations) along the major axis is larger than the stiffness along the minor axis.

The former may imply that a main body of the insert portion has a non-round shape in cross section and/or may include the possibility that energy directors in the form of ribs or humps extending outwardly from a main body are inhomogeneously distributed or sized.

For the latter, a variety of possibilities exist.

In accordance with a first example, the insert portion includes at least one groove running in axial direction along the insert portion.

In this, "running in axial direction" does not imply that the at least one groove is strictly parallel to the insertion axis. Rather, for example also slightly helical shapes are possible; often the angle should not exceed about 30° to the axis. The groove has a substantial depth, thus exceeding the characteristic dimension of energy directors. For example, the groove may have a depth of at least 15%, more preferable at least 30% or at least 50% of an average shaft diameter of the insert portion.

Embodiments of the first example include embodiments that have a plurality of grooves, for example arranged in a staggered manner. For example, the grooves may be on opposite lateral sides of the insert portion, in a staggered arrangement. Such grooves may have a substantial depth $d_g$ of at least 30%, at least 40% or at least 50% and at most 80% of the lateral extension e of the insert portion at that position. Especially, in embodiments, the cross section of the insert portion may be generally S-shaped.

In accordance with a second example, the insert portion may be slitted into at least two parts, with the slit extending from the distal end in an axial direction.

Embodiments of the first or second example may include causing parts of the insert portion that are separated by the slit/groove to be pressed together by the pressing force, and optionally to be welded together by the effect of the transferred energy.

In accordance with a third example, the insert portion may include a hole extending proximally from the distal end, wherein the hole is not rotationally symmetric so that the material strength of the insert portion is inhomogeneous. Especially, the material strength may be larger in directions along the minor axis than along the major axis, whereby the stiffness along the minor axis is smaller than along the major axis.

Further possibilities exist, for example with inhomogeneous material compositions, or with inhomogeneous densities (for example in the case of a porous first object material), etc.

Combinations of these examples and possibilities exist, for example at different axial positions; also, it is possible to combine a groove or slit with an opening, whereby the opening forms part of the groove or slit.

In embodiments with an asymmetric insert portion, the method may, according to an option, include the further step of positioning the first object relative to the opening and thereby orienting the first object so that the major axis is aligned with the second direction, e.g. an in-plane direction with respect to the broad surface and the minor axis is aligned with the first direction, e.g. an out-of-plane direction.

The opening in the second object may be circular in cross section. Circular openings feature the advantage of being easy-to-manufacture, for example by drilling.

In an alternative group of embodiments, the opening in the second object may be non-circular. Especially, the opening may be elliptical with the major ellipse axis being oriented in the second direction, e.g. an out-of-plane direction with respect to the broad surface. If the opening is not circular, the insert portion of the first object may, according to one possible embodiment, be symmetrical with respect to rotations around its axis, with the possible exception of energy directors along its outer surface and need not be oriented in a particular manner for insertion.

As mentioned above, in embodiments, the opening and the insert portion are adapted to each other for the insert portion to be inserted with an interference fit.

The fact that the opening and the insert portion are dimensionally adapted to each other for an interference fit (press-fit) implies that the insert portion is oversized at least locally compared with the opening, resulting in at least local pressure between insert portion and opening wall when the insert has a desired position within the opening, i.e. resulting in elastic compression of the insert portion and/or the wall of the opening. Therein, the named first and second materials are arranged opposing each other at least in parts of areas of such material compression.

Especially, the opening and the insert portion may be adapted to each other so that the insert portion is oversized at least in the in-plane dimension with respect to the broad surface. Thus, at least opposite surface sections of the insert portion that are spaced from each other along the major axis are subject to a pressing force.

This feature that the insert portion and the opening are adapted to each other for the insert portion to be positioned in the opening with an interference fit may, but does not need to be, used for establishing an interference fit before the step of anchoring, in accordance with the above-mentioned second approach. Then, the method includes the further step of establishing the interference fit by placing the insert portion in the opening and applying an interference force, and the step of anchoring the insert portion is carried out after the step of establishing the interference fit.

In alternative embodiments, no interference fit is established prior to the anchoring step, but the fact that the insert portion and the opening are adapted to each other for the insert portion to be positioned in the opening with an interference fit merely implies that an interference could be established if the insert portion was pressed further into the opening. In these embodiments, the insert portion prior to the anchoring step is placed relative to the opening only to an extent that no substantial force is necessary. During the step of anchoring, the insert portion is further moved relative to the opening, for example by being pressed further into the opening, until the opposite surface areas of the insert portion and the opening are in contact with each other, while at the same time parts of the first material are liquefied. These alternative embodiments are based on the above-mentioned first approach.

The second object may be a board of a wood-based material, as explained further below. The second object may especially be a board or more complex component part with a board shaped section being a part of a furniture to be assembled. Other kinds of second objects, including objects for other industries than the furniture industry, are not excluded.

In addition to adapting the cross sections of the insert portion and the opening to each other in a manner described in this text, further measures may be taken to prevent portions of the second object from cracking, flaking off or bulging. Especially, the method may include the further step of applying a clamping force to the second object while the insert portion is at least partially inserted in the opening, the clamping force acting between clamping elements acting on the broad surface and an opposing surface, the clamping force acting in a direction non-parallel to the opening axis—substantially as described in detail in PCT/EP2015/061855.

In embodiments of the invention, the first material is solid (at ambient temperature) and includes thermoplastic properties (i.e. it is liquefiable with the aid of thermal energy; in the following this material is called "thermoplastic material").

The second material is also solid and it is penetrable by the first material when the latter is in a liquefied state (i.e. the second material is fibrous or porous, it includes penetrable surface structures or it cannot fully resist such penetration under pressure). The penetrable material especially is rigid and substantially not elastically flexible (no elastomer characteristics). It further includes (actual or potential) spaces into which the liquefied material can flow or be pressed for the anchoring. It is, e.g., fibrous or porous or includes penetrable surface structures which are e.g. manufactured by suitable machining or by coating (actual spaces for penetration). Alternatively the penetrable material is capable of developing such spaces under the hydrostatic pressure of the liquefied thermoplastic material, which means that it may not be penetrable or only to a very small degree when under ambient conditions. This property (having potential spaces for penetration) implies, e.g., inhomogeneity in terms of mechanical resistance. An example of a material that has this property is a porous material whose pores are filled with a material that can be forced out of the pores, a composite of a soft material and a hard material or a heterogeneous material (such as wood) in which the interfacial adhesion between the constituents is smaller than the force exerted by the penetrating liquefied material. Thus, in general, the penetrable material includes an inhomogeneity in terms of structure ("empty" spaces such as pores, cavities etc.) or in terms of material composition (displaceable material or separable materials).

Especially, the second material is not only solid at ambient temperature, but is such that it does not melt, at least not to a substantial degree, under the conditions that apply when the first material penetrates the surface structures. For example, the second material may be of a material that does not have thermoplastic properties, i.e. a material different from a thermoplastic material. The second material may further be such that it does not undergo a reversible liquefaction process or that it has a melting temperature substantially above a temperature at which the first material becomes liquefied. For example, if the second material is meltable, for example if it is a metallic foam, its melting temperature or glass transition temperature may be higher than a glass transition temperature or melting temperature of the first material by at least 50° C. or at least 80° C. or at least 100° C.

The energy necessary for liquefying the thermoplastic material in the anchoring step may be supplied, as above discussed, to either one of the two objects. In embodiments, this is done in the form of mechanical energy, such as mechanical vibration, in particular ultrasonic vibration, to be transformed into friction heat at the interface between the insert portion and the wall of the opening. The vibration for example has a main vibration direction parallel to the named opposite surfaces of insert portion and opening wall. Preferred therefore are, for achieving lateral anchorage, longitudinal vibrations substantially parallel to the depth of the opening or rotary vibrations with an axis substantially parallel to the depth of the opening.

Especially, the vibration energy may be coupled into the first object via a proximally facing end face that then serves as coupling face. A distal outcoupling face of a sonotrode may be pressed against this coupling face while the mechanical vibrations act on it. Thereby, the first object may be pressed further into the opening while anchoring takes place. Especially, the coupling face may be a proximal end face of a head portion of the first object. A distally facing shoulder formed by the head portion may serve as a stop face for the movement of the first object further into the second object by the effect of the pushing force by the sonotrode.

A proximal end face—that may serve as the coupling face—may be attached, as an add-on, to a head portion and may include an alignment feature with a well-defined orientational relationship with the—then asymmetric—insert portion. For aligning the major axis of the insert portion, an alignment means of the machine used for carrying out the process cooperates with such an alignment feature.

Other sorts of energy than mechanical vibration energy, such as e.g. irradiation with electromagnetic energy for which suitable absorbing means are to be provided at the locations where the interference fit is active, or corresponding heating (e.g. inductive or resistive heating) are applicable also.

The thermoplastic material and the penetrable material taking part in the anchorage may be present only on selected surfaces of the insert portion and on walls of the opening. For example, the insert portion may include a core of a not thermoplastic material and a coating thereof made of the thermoplastic material. However, they may also constitute larger portions of the two objects, which may include further portions of different materials or may fully consist of either the thermoplastic material or the penetrable material.

In the regions of the opposite surface areas either one of the two surfaces being pressed together may include structures functioning as energy directors, i.e. point-shaped or line-shaped elements protruding from a principal surface.

As mentioned, the second object may include a wood-based material, such as chipboard, particle board, cardboard, fibre board, such as High Density Fibre board (HDF) and Medium Density Fibre board (MDF), or wood (also in the form of plywood). In this text "chipboard" is also used to refer to any composite materials manufactured by mixing wood particles of any shape with adhesives, independent of the product's shape, including for example oriented strand board.

Examples of second materials (penetrable materials), therefore, include the above mentioned wood-based materials and further include metallic or ceramic foams, porous glass, sintered ceramic, glass or metal materials, concrete brick material, or possibly open porous structures of a material based on a not thermoplastic (thermosetting) polymer, wherein such materials include spaces into which the thermoplastic material can penetrate, which spaces are originally filled with air or with another displaceable or compressible material. A special class of second objects is 'sandwich material' objects in which a layer of a less dense material is sandwiched between two layers of denser materials.

A thermoplastic material suitable for first object is, under the conditions prior to transferring the energy, also solid in the sense as above described for the penetrable material. It preferably includes a polymeric phase (especially C, P, S or Si chain based) that transforms from solid into liquid or flowable above a critical temperature range, for example by melting, and re-transforms into a solid material when again cooled below the critical temperature range, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g. fibres or particles of material that has no thermoplastic properties or has thermoplastic properties including a melting temperature range that is considerably higher than the melting temperature range of the basic polymer.

Examples for the thermoplastic material applicable in the method according to the invention are thermoplastic polymers, co-polymers or filled polymers, wherein the basic polymer or co-polymer is e.g. polyethylene, polypropylene, polyamides (in particular Polyamide 12, Polyamide 11, Polyamide 6, or Polyamide 66), Polyoxymethylene, polycarbonateurethane, polycarbonates or polyester carbonates, acrylonitrile butadiene styrene (ABS), Acrylester-Styrol-Acrylnitril (ASA), Styrene-acrylonitrile, polyvinyl chloride, polystyrene, or Polyetherketone (PEEK), Polyetherimide (PEI), Polysulfon (PSU), Poly(p-phenylene sulfide) (PPS), Liquid crystall polymers (LCP) etc. LCPs are of particular interest since their sharp drop in viscosity during melting enables them to penetrate in very fine spaces in the penetrable material.

Usually either one of the two objects to be joined needs to be able to transfer the vibration energy, preferably with a minimum of energy loss, from a proximal object side, where a vibrating tool is applied, to a distal side, where the insert portion or the opening is arranged. If this object is fully made of the thermoplastic material the latter will need an elasticity coefficient (at ambient temperature) of at least 0.5. GPa or preferably of at least 1.0 GPa.

Mechanical vibration or oscillation suitable for the method according to the invention has preferably a frequency between 2 and 200 kHz (even more preferably between 10 and 100 kHz, or between 20 and 40 kHz) and a vibration energy of 0.2 to 20 W per square millimeter of active surface. The vibrating tool (e.g. sonotrode) is, e.g., designed such that its contact face oscillates predominantly in the direction of the tool axis (longitudinal vibration) and with an amplitude of between 1 and 100 μm, preferably around 30 to 60 μm. Such preferred vibrations are, e.g., produced by ultrasonic devices as, e.g., known from ultrasonic welding.

The invention also concerns a machine for carrying out the method. Such a machine includes an insertion mechanism capable of inserting the insert portion at least partially in the opening, an anchoring tool capable of transferring the energy suitable for liquefaction of the first material to the first object or the second object, or both, for the anchoring step. Therein, the insertion mechanism may optionally be capable of orienting the first object relative to the second object in a manner that the pressing force acting in the first direction, e.g. a direction perpendicular to the broad surface is smaller than the pressing force acting in the second direction, e.g. a direction parallel to the broad surface. Especially, if the insert portion has a major axis and a minor axis as defined hereinbefore, then the insertion mechanism may be equipped for inserting the insert portion into the opening at least to some extend wherein the major axis is oriented aligned with the second direction, e.g. an in-plane direction with respect to the broad surface.

The machine may optionally further include a clamping mechanism capable of applying a clamping force to the second object during insertion or anchoring or both.

The machine may include an insertion station and an anchoring station separate therefrom, wherein the clamping mechanism is capable of applying the clamping force at least in the anchoring station.

Alternatively, the machine may be equipped for carrying out the steps of inserting and of anchoring at a same station. In such embodiments, the machine may include a gripping arrangement adapted for holding the first object in place for insertion, for example without substantial force, wherein the anchoring tool is adapted for contacting the first object adjacent to the gripping arrangement and for inserting the insertion portion into the opening.

For carrying out the process simultaneously for different first objects (for example fittings) at different anchoring sites of a same (or possibly different) second object, the machine may include a plurality of insertion and anchoring sites. For carrying out the method for different second objects, a distance between the insertion and anchoring sites may be adjustable.

The invention moreover concerns a joining element suitable for the method described hereinbefore. Especially, the joining element includes an insert portion for in-depth anchoring in the object, and, proximally of the insert portion, a head portion, for example, with a distally facing shoulder or a border line between the head portion and the anchoring portion, the joining element including a thermoplastic material at least on a surface of the anchoring portion, wherein the insert portion has a larger stiffness along a major axis than along a minor axis—as discussed hereinbefore.

Applications of the concepts described in this text and illustrated in the figures include the furniture industry, especially furniture designed for self-assembly by the customer. In this, the first object may be a fitting, and the second object may be a furniture part with a board-shaped section.

Further applications include other branches of mechanical engineering and constructions, including the automotive, aviation and shipbuilding industries where the method may be suitable of anchoring an anchor in a lightweight board of any composition, building industry, etc.

In this text, the terms "radial" and "axial" are to be understand as relating to the insertion axis (insert portion axis) and the opening axis, also referred to as "z" axis in this text. The "major axis" and the "minor axis" of the insert portion or of the opening are generally axes perpendicular to the insertion axis/opening axis. "In-plane" and "out-of-plane" refer to directions relative to the broad surface.

BRIEF DESCRIPTION OF THE DRAWINGS

The invention and embodiments thereof are described in further detail in connection with the appended drawings that are all schematic in nature. Same reference numbers refer to same or analogous elements. In the drawings.

DESCRIPTION OF THE PREFERRED EMBODIMENTS

Figure 1:
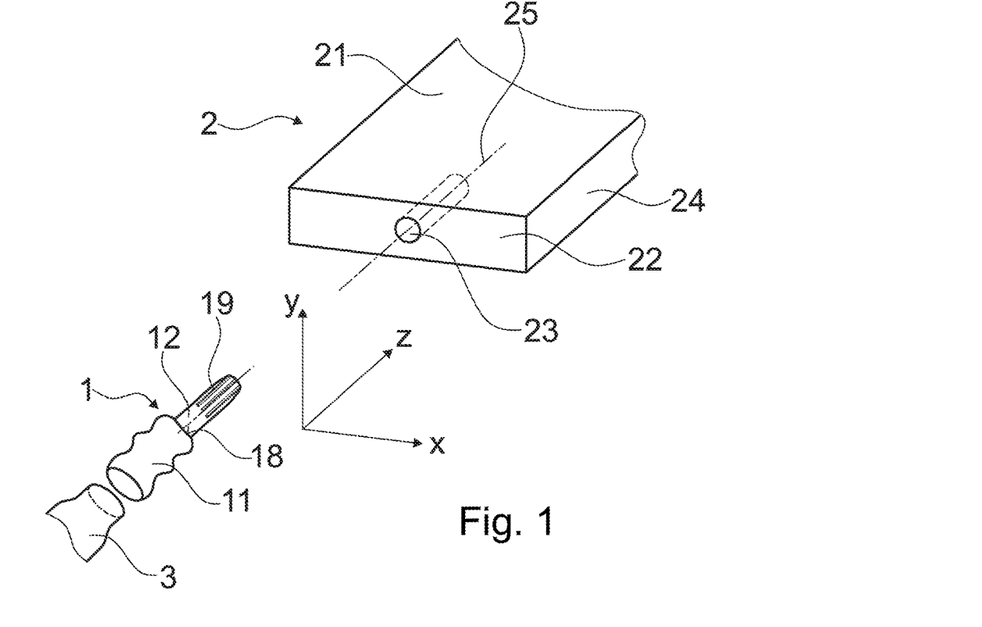
FIG. 1 illustrates a basic configuration.

FIG. 1 depicts a fitting element 1 as an example of a first object. The fitting element has a head portion 11 and an insert portion 12. The head portion 11 has a lateral outer surface that is shaped to engage into a corresponding structure of a female part of a further object so that the second object into which the fitting element is anchored and the further object may be assembled to one another. Especially, the lateral outer surface has a structure that makes a positive-fit connection with the female part possible, in a manner that forces in axial directions can be transferred between the head portion 11 and the female part in a positive-fit manner (in positive-fit connections, the connecting force in contrast to frictional fits has a component perpendicular to the surface—the joined objects are in each other's way). Especially, in this embodiment and in any other embodiment discussed in this text, the head portion may be shaped according to the teaching of WO 2013/104422, and may have the function of serving as male part of a joint described therein.

The head portion defines a distally facing shoulder 18 that serves as a stop face when the fitting element is anchored in the second object.

The fitting element 1 includes a thermoplastic material, for example a polyamide and is, according to an embodiment, made entirely or almost entirely from this thermoplastic material, whereas in alternative embodiments it may include a core of a not thermoplastic material with a coating of a thermoplastic material. Especially, at least an outer surface of the insert portion 12 is made of the thermoplastic material. The outer surface of the insert portion 12 may include energy directors 19, for example ribs or humps or other structures. In the illustrated embodiment, the energy directors include axially running ribs.

The second object is a board 2 of, for example, chipboard. The board has two opposed broad surfaces 21, two side surfaces 24 and a narrow side face 22 with an opening 23 (or two narrow side faces, the opposite narrow side face not being shown in FIG. 1). The opening 23 has an opening axis 25 that is coaxial with an insertion axis (or insert portion axis) of the insert portion 12 when the fitting element 1 is anchored and thus corresponds to an insertion axis.

FIG. 1 also illustrates a coordinate system used in this description, wherein the z direction is parallel to the opening axis, and x and z are in-plane directions (i.e. directions parallel to the broad surface), and y is perpendicular thereto. In the depicted configuration, x and y are parallel to the narrow side face 22.

The insert portion 12 has, at least in in-plane directions parallel to the x-axis a slightly oversized cross section compared to the opening 23 so that the insert portion is held in an interference fit in the opening 23 after the insert portion 12 has been introduced, for example by a pushing force acting in a direction of the axis 25. Due to the interference fit, opposite surface areas of the insert portion 12 and the opening 23 are pressed against each other. In the subsequent anchoring step, a vibrating tool, namely a sonotrode 3 is used to couple mechanical vibration energy into the fitting element 1 to liquefy portions of the thermoplastic material of the fitting element 1, that then penetrate into structures of the board 2 and yield, after the energy input stops, the above-described anchoring.

As described hereinbefore, the opening and the insert portion are adapted to each other in a manner that there is an asymmetry with respect to different directions in the x-y-plane. More in particular, they are adapted to each other so that the pressing force between the opposite surface areas acting along a second direction, parallel with the x-direction, i.e. in-plane directions in ±x directions is larger than the force in a first direction parallel with the y-direction, i.e. out-of-plane directions (±y directions).

Figure 2:
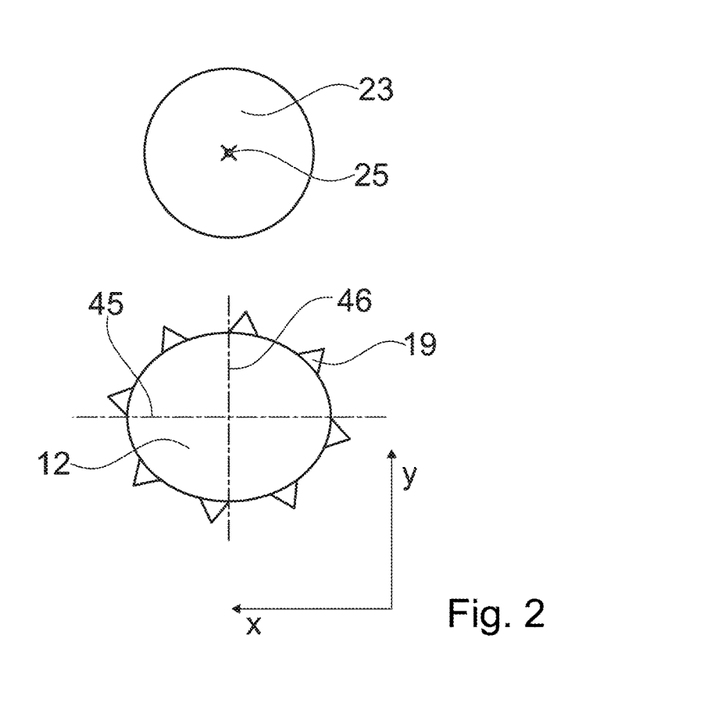
FIG. 2 shows a cross section of an example of an insert portion together with a cross section of the opening.

FIG. 2 shows an example of a cross section of the opening 23 and of an accordingly adapted cross section of the insert portion 12. The opening 23 has a circular cross section, and the insert portion has an out-of plane radial dimension (dimension in the y-direction) that approximately corresponds to the opening diameter but has an in-plane radial dimension (dimension in the x-direction) that is larger, so that the cross section is approximately—with the exception of the energy directors 19—elliptical. Thereby, the insert portion has a major axis 45 and a minor axis 46, wherein the major axis 45 is aligned with the in-plane direction (x-direction).

FIGS. 3*a*-3*f* show different variants of insert portion 12 cross sections, all suitable for openings 23 with a circular cross section. In all of these figures, the major axis is oriented horizontally.

Figures 3A, 3B:
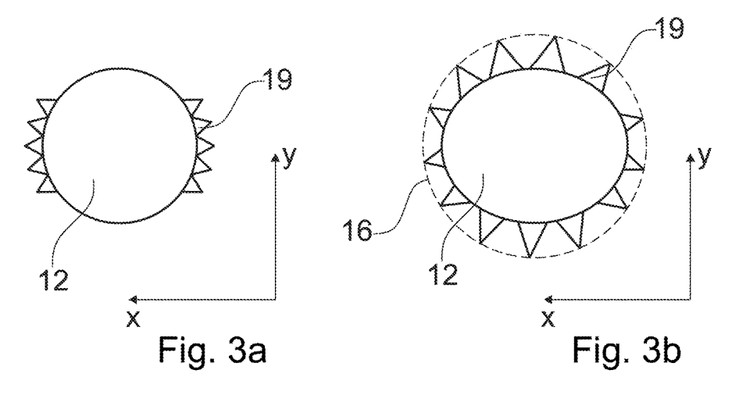
FIGS. 3a-3f show different embodiments of insert portions with a major axis and a minor axis.

In the variant shown in FIG. 3*a*, the insert portion 12 has a circular cross section with a diameter approximately corresponding to the diameter of the opening 23, but with the energy directors 19 concentrated on opposing lateral surfaces that are oriented to point into the in-plane directions (in the +/−x-direction). Combinations of this approach with the one of FIG. 2 (i.e. insert portions with a non-circular overall cross section and with inhomogeneously distributed energy directors) are possible.

FIG. 3*b* shows a variant with the insert portion 12 having a main body with an approximately elliptical shape but with energy directors of different sizes so that an outer enveloping surface 16 has an approximately circular cross section. The diameter of the outer enveloping surface will be chosen to be greater than the diameter of the opening. With this arrangement the contact forces, when inserting the insert portion 12 into a circular opening, will be lower in out-of-plane directions (y-directions) than in in-plane directions (x-directions).

Figure 3C:
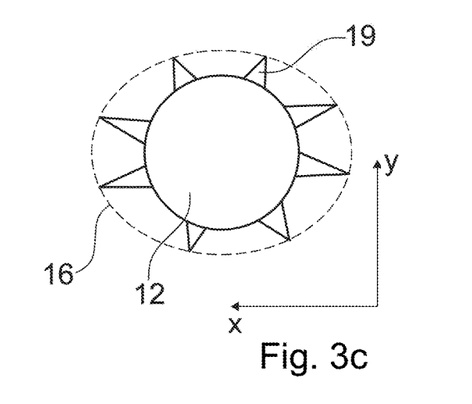

FIG. 3*c*, in contrast shows the insert portion 12 with a circular main body, similar to the embodiment of FIG. 3*a*, but with the outer enveloping surface 16 having an elliptical cross section. The diameter of the main body will correspond to or be slightly smaller than the diameter of the opening.

Figure 3D:
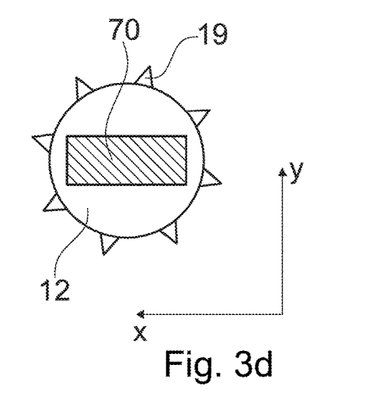

FIG. 3*d* shows the insert portion 12 with a generally circular cross section and with evenly distributed energy directors 19 of a same size. However, a hard core 70 of a not liquefiable material—for example a metal—is not circularly symmetric and causes an anisotropy. More in particular, the major axis is where there is less thermoplastic material between the hard core and the outer surface. Also with this arrangement the contact forces, when inserting the insert portion 12 into a circular opening, will be lower in out-of-plane directions (y-directions) than in in-plane directions (x-directions).

The embodiment of FIG. 3*d* is one of many possible examples in which the first object 1 does not consist of the thermoplastic material but is composed of different portions of different materials. In addition or as an alternative to a hard core, the first object may also have a head, a connecting structure (for example a bushing) or other functional element of another material than the thermoplastic material.

Figure 3E:
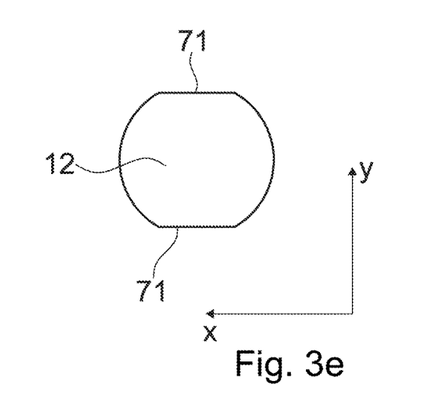

FIG. 3*e* shows an example of an embodiment with flattenings 71. The cross section of the insert portion 12 especially may be such that at the position of the flattenings 71 there is no physical contact between the insert portion and the walls of the opening. This leaves space for liquefied material to flow to for relaxation of contact forces in the out-of plane direction (y-direction) during the anchoring step.

Figure 3F:
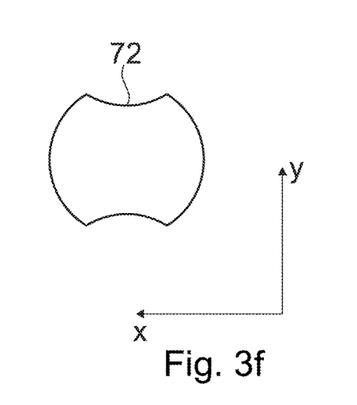

FIG. 3*f* shows a variant that is similar to the embodiment of FIG. 3*e* but because the cross section includes shallow indentations 72 instead of the flattenings, the internal stress within the insert portion upon insertion in the opening is more evenly distributed because around the edges between the convex and concave curvature the material can give in elastically.

The variants of FIGS. 3*e* and 3*f* can of course also include energy directors (not shown in the figures).

Arbitrary combinations of the concepts of these embodiments are possible. For example, the embodiments may both, have a main body with a non-circular cross section and energy directors of unequal sizes, also if the outer enveloping surface is, in contrast to FIG. 3*b*, not circular. Also, any embodiment may have a hard core (with a circular cross section or with a non-circular cross section as shown in FIG. 3*d*) and/or flattenings or indentations, etc.

Figure 4:
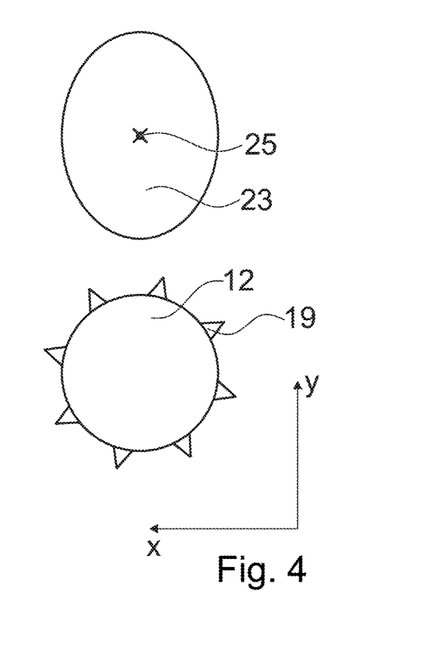
FIG. 4 illustrates an embodiment with an opening that does not have circular symmetry.

In the embodiment of FIG. 4, the opening 23 has a non-circular cross section. More in particular, it is elliptical with the major axis of the ellipse being oriented in the out-of-plane direction, i.e. in the y-direction. The insert portion 12 may then have an essentially circular cross section. In the depicted configuration, the diameter of the insert portion 12 approximately corresponds to the extension of the opening 23 along the out-of-plane direction, i.e. the y-direction, so that, with respect to the in-plane direction, i.e. the x-direction, the insert portion 12 is slightly oversized. With this arrangement the contact forces, when inserting the circular insert portion 12 into the elliptic opening 23, will be lower in out-of-plane directions (y-directions) than in-plane directions (x-directions).

The variant of FIG. 4 features the advantage that the insert portion 12 need not be brought into a particular orientation with respect to the "roll angle" (i.e. the angle around the insertion axis) but just needs to be aligned with the opening axis.

In addition or as an alternative to having a cross section that is oversized with respect to the opening in in-plane directions, i.e. in x-directions and being not oversized or oversized to a lesser extent along out-of-plane directions, i.e. in y-directions, the insert portion 12 may include other measures for achieving that the pressing force is larger in in-plane directions than in out-of-plane directions.

More in particular, the insert portion may have a stiffness with respect to elastic (and/or possibly plastic) deformations, and the stiffness along the in-plane (x-) axis is greater than the stiffness along the out-of-plane (y-) axis. (More in general, the stiffness may be expressed by a stiffness tensor, wherein the deformation force vector F and the deformation vector x are, in the linear (=small deformation) approximation, related to each other by F=κ*x, where κ is the stiffness tensor, and then the condition is that for absolute values of the diagonal elements $\kappa_{xx}$ and $\kappa_{yy}$, the relation Abs($\kappa_{xx}$)>Abs($\kappa_{yy}$) holds).

Figure 5A:
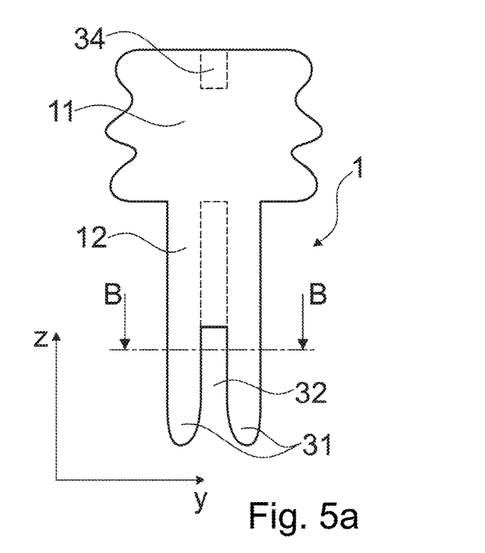
FIGS. 5-11 show further embodiments of insert portions with a major axis and a minor axis, wherein the stiffness along the major axis is different from the stiffness along the minor axis.
Figure 5B:
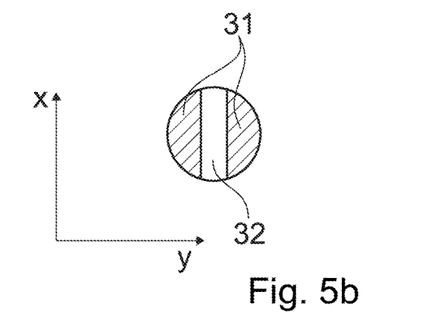

A first example of a first object (again being a fitting element 1) of this kind is illustrated in FIGS. 5a and 5b. FIG. 5b shows a section along the plane B-B in FIG. 5a. The insert portion 12 towards the distal end is slitted into two prongs 31 with a slit 32 therebetween. The slit 32 may extend along a part of the insert portion only, as shown by the solid line in FIG. 5a, or it may extend along a full length of the insert portion as illustrated by the dotted line.

Because it is slitted, the insert portion has a smaller stiffness along the axis that corresponds to the drawing plane in FIG. 5a (minor axis) than along the axis perpendicular to the drawing plane in 5a (major axis). The minor axis of the insert portion is thus oriented to be aligned with the out-of-plane axis y when it is placed relative to the opening and pushed into it.

Yet another optional feature of any first object is illustrated in FIG. 5a. This further optional feature is independent of the layout of the first object illustrated in FIG. 5a and especially of its insert portion 12 and may optionally be realized in any first object, especially with an asymmetrical insert portion. This further optional feature is an insert portion alignment structure 34, for example a proximal groove, which is attached, as an add-on, to the head portion. Such insert portion alignment structure 34 has a well-defined orientational relationship with the insert portion 12 and may be used to align the first object 1 with the orientation of the second object 2 such that a correct orientation of the insert portion 12 relative to the opening 23 may be secured prior to inserting the insert portion 12 into the opening 23. Hence, the insert portion alignment structure 34 is attached to the head portion 11, but has nothing to do with the functionality of the head portion 11. Instead, the alignment structure 34 is from a functional point of view connected to the insert portion 12. For example, if the alignment structure is a proximal groove, the proximal groove is to be aligned parallel or perpendicular to the plane of the broad surface. Many alternative shapes are possible, including a rectangular groove or a cross with arms of not-equal lengths or similar, the only condition being that the shape is not symmetrical with respect to rotations about 90°.

Figure 6:
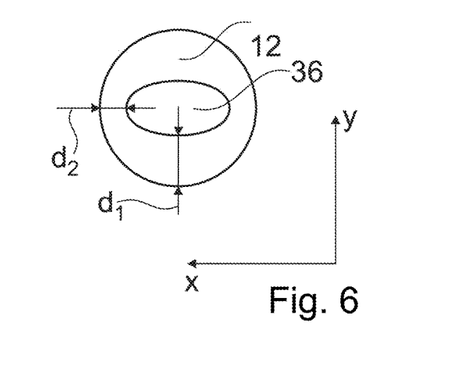

FIG. 6 shows yet another possibility. The insert portion has a central hole 36 extending axially along at least a portion of the insert portion's length, especially extending to the distal end thereof and for example extending along its full length or even further into the head portion. The central hole has a cross section that is asymmetrical with respect to rotations about 90°. In the depicted embodiment, the central hole is elliptical. By this, the stiffness of the insert portion with respect to deformations along one axis (minor axis) perpendicular to the insertion axis (in the orientation shown in the figure the up-down direction) is smaller than the stiffness with respect to deformations along the axis (major axis) perpendicular thereto. The according orientation relative to the second object is illustrated by the x and y axes shown in FIG. 6, too.

Figure 7:
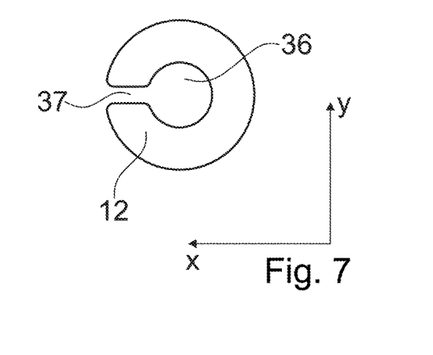
Figure 8:
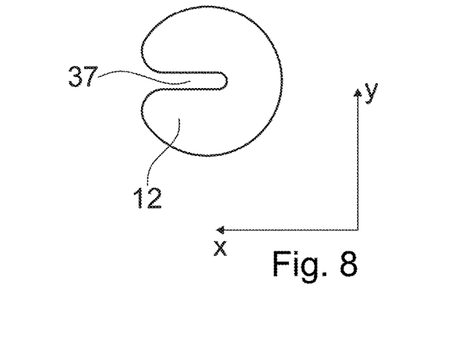

An even further possibility is shown in FIGS. 7 and 8 showing two different variants of an insert portion that is provided with an axially running groove 37. Again, the groove will preferably extend to the distal end and may run along a full length of the insert portion. In the embodiment of FIG. 7, the groove opens into a hole 36 of the hereinbefore described kind, which hole itself may have a circular cross section or an elliptical cross section and may be perceived as belonging to the groove, which groove then has an undercut. In FIG. 8, there is also a groove 37, but no hole.

Due to the groove 37, the respective insert portion again has a minor axis (oriented parallel to the y direction) and a major axis (oriented parallel to the x direction).

Figure 9A:
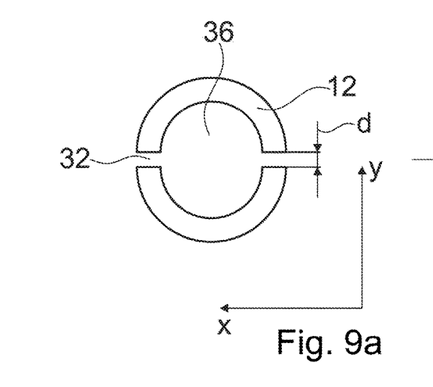
Figure 9B:
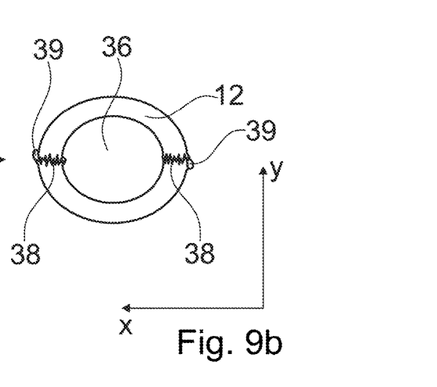

FIGS. 9a and 9b show an even further variant that is based on the concept of the insert portion being provided with a slit 32, but at the same time the insert portion 12 also includes an axially running central hole 36 so that it includes two parts each having the shape of a half shell in cross section.

An optional feature of this variant and also of other variants including a groove or a slit, for example the variant of FIG. 7, is shown in FIG. 9b. The extension of the slit 32 (or groove) may be chosen so that it is closed off when the insert portion 12 is pressed into the opening. By the joint effect of the energy transferred and the parts being pressed together, a weld 38 is generated between the parts. FIG. 9b also shows liquefied material portions 39 that are pressed outwards and into surrounding material of the second object for the anchoring.

Combinations of the approaches shown in the figures are well possible, for example different cross sections may be present at different axial depths.

Figure 10:
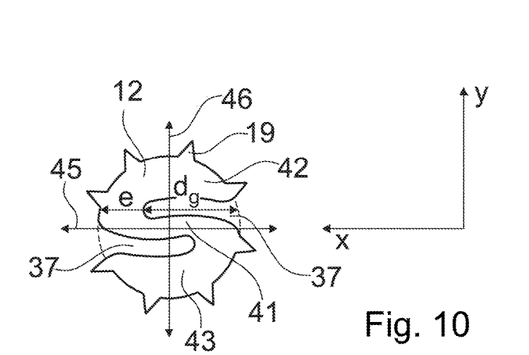

In the embodiment of FIG. 10, the cross section through the insert portion 12 is generally S-shaped, thus with two staggered grooves 37 of substantial depth extending from opposite sides into the volume of the insert portion.

Especially, the grooves in the depicted configuration are as deep as to extend across a middle plane (perpendicular to the groove direction), i.e. the depth $d_g$ of the groove is greater than 50% of the local extension e at that place. Generally, also pertaining to other configurations with at least one groove 37, the depth of grooves 37 will be substantial, for example at least 30% or at least 40% or at least 50% of the extension.

By this design a main beam 41 and two side beams 42, 43 are formed that provide substantial stiffness with respect to loads acting in directions along the major axis 45 (x-direction), whereas the stiffness along the minor axis 46 (y-direction) is reduced compared to a full cylinder.

Figure 11:
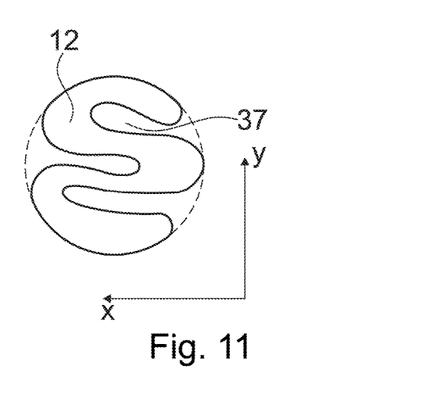

This teaching can be readily generalized to only one groove (FIG. 8) or to more than two staggered grooves 37 (for example as sketched in FIG. 11), for higher numbers of grooves, with increasingly lower stability in directions along the minor axis.

FIG. 10 also illustrates optional energy directing ribs 19.

A further advantage of designs with a groove or an axially extending hole is that they have a better homogeneity of the material strength in that the thickness of solid portions is approximately homogeneous—compared to a design with a circular cross section. It has been found that this is advantageous for injection molding. In injection molding, especially of bulky parts, void formation may be a problem. However, voids tend to be prevented if the cross section of the injection molded parts is homogeneous, not only as a function of the axial position but also in a cross section. Especially, it may be advantageous for the injection molding process, if the distances between opposite mold walls are comparably homogeneous.

In all embodiments, the insert portion—with the possible exception of energy directing structures—and the opening may be cylindrical, i.e., symmetric with respect to translations along the insertion axis. However, this need not be the case. Rather, also slightly conical and/or stepped or otherwise axially structured shapes are possible for the opening and/or the insert portion.

Figure 12:
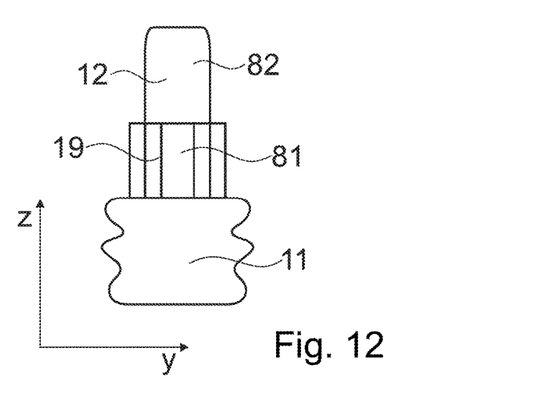
FIG. 12 shows a first object with axially separated sections.

An according example is schematically illustrated in FIG. 12. The insert portion 12 is divided into a proximal portion 81 and a distal portion 82. The proximal portion 81 includes energy directors 19 and constitutes a first liquefaction zone. A second liquefaction zone may be constituted by the distal portion 82 that is pressed against a bottom of the opening 23 during the anchoring process. The various alternative embodiments to obtain anisotropy conditions (asymmetry with respect to rotations around 90°) that are discussed for embodiments of first objects 1 in this text, see e.g. FIGS. 2, 3a-3f, 5a-11, etc., may for example hold for the proximal portion 81, whereas the distal portion 82 may optionally have an essentially circular cross section.

Figure 13:
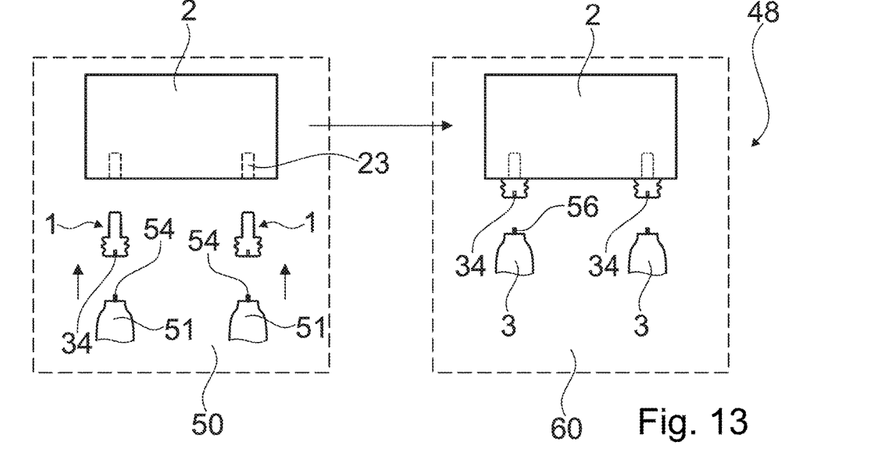
FIG. 13 schematically shows a machine for carrying out the method, the machine including two stations.

FIG. 13 illustrates a machine 48 for carrying out an embodiment of the method according to the invention. The depicted machine includes two stations, namely an insertion station 50 in which first objects—fitting elements 1—are inserted into openings 23 of a second object (here: board 2), and an anchoring station 60 in which sonotrodes 3 apply mechanical vibration energy to the fitting elements 1. After insertion of the fitting elements 1 into the board 2 at the insertion station 50, the board 2 is moved to the anchoring station 60 where the anchoring process is carried out.

Therein, for embodiments in which the fitting elements have anisotropy in the cross section of the insert portion 12, such as those embodiments illustrated in FIGS. 2, 3a-f, 5a-11, at least the insertion station 50 may optionally be equipped for placing the first objects relative to the second objects with a defined orientational relationship. For example, a gripping and placing tool 51 of the insertion station 50 may include a guiding feature 54 cooperating with an insert portion alignment structure 34 of the above discussed kind. (FIG. 5a), the guiding feature 54 being adapted to turn the insert portion 12 to a desired position, with regard to orientation in the x- and y-directions, relative to the opening 23 prior to inserting the insert portion 12 into the opening 23. As an alternative, the insert portion 12 may have an end structure that makes it turn when entering the opening, at least when the opening is asymmetrical.

Optionally, also the sonotrodes 3 may be provided with respective guiding features 56 cooperating with the respective insert portion alignment structures 34 of the first objects 1, such that the respective insert portion 12 can be turned to a desired position, in the x- and y-directions, in the anchoring station 60, either as alternative to, or in combination with, turning the insert portion 12 to a desired position in the insertion station 50.

The machine 48 may further include a drilling station (not shown) in which the openings 23 are made.

As an alternative to being a two-station machine or multiple station machine, the machine for carrying out the process may also be a single station machine. Then, the placing step and the anchoring step are carried out at the same place subsequently. Also in such an embodiment, a gripping and placing tool and/or sonotrode may include a feature that aligns the orientation of the first object with respect to the second object, such features including, for example, an insert portion alignment structure 34 on the first object, and a guiding feature 54, 56 on the gripping and placing tool and/or on the sonotrode.

Figure 14:
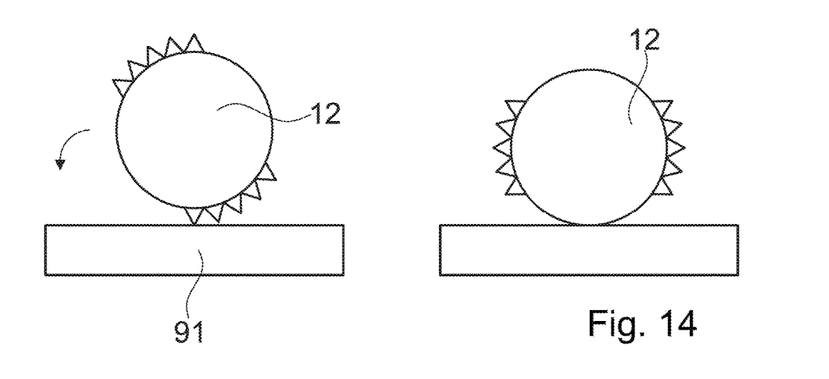
FIG. 14 illustrates an alternative mechanism for orienting the first object.

In embodiments, as an alternative to an alignment feature of the proximal contact face of the first object, the machine may implement other mechanisms for defining the orientation of the insert portion. An example is very schematically illustrated in FIG. 14. The machine in this example includes an orientation board 91 on which the first object, here illustrated in the form of an embodiment of a fitting element 1 of the type illustrated in FIG. 3a, is placed, optionally while being mechanically slightly agitated. Due to gravity, the insert portion 12 adopts a defined position, which is the desired position in the x- and y-directions for insertion into the second object, as illustrated in FIG. 14. This option of aligning of course is only available in case the insert portion 12 has suitable properties and not, for example for embodiments like the one of FIG. 3d.

What is claimed is:

1. A method of anchoring a first object in a second object, the method comprising the steps of:
   providing the first object comprising a first material and providing the second object comprising a second material, wherein the first material is solid and comprises thermoplastic properties and wherein the second material is solid and is penetrable by the first material when in a liquefied state,
   the second object having an insertion face,
   wherein the second object comprises an opening having a mouth in the insertion face, the opening having an opening axis,
   wherein the second object, around the opening, has an anisotropic strength with respect to forces perpendicular to the opening axis,
   and the first object further comprising an insert portion,
   placing the first object relative to the second object so that the insert portion reaches into the opening or is placed about the mouth thereof,
   anchoring the insert portion of the first object in the opening by transferring energy suitable for liquefaction of the first material to the first object in an amount and for a time sufficient, for at least partial liquefaction of the first material and interpenetration of the first and second materials in the vicinity of the opposite surface areas;
   stopping the transfer of energy for a time sufficient for the first material liquefied during the step of anchoring to re-solidify,
   wherein a cross section of the opening perpendicular to the opening axis and a cross section and orientation of the insert portion are adapted to each other so that upon insertion of the insert portion in the opening the opposite surface areas of insert portion and opening are pressed against each other by a pressing force that varies around the circumference of the opening, the pressing force between the opposite surface areas acting in a direction of smaller strength of the second object being smaller than the pressing force acting in a direction of larger strength.

2. The method according to claim 1, wherein the second object has a section defining a broad surface, the insertion face being at an angle to the broad surface, wherein directions parallel to the broad surface are directions of larger strength and directions perpendicular to the broad surface are directions of smaller strength.

3. The method according to claim 2, wherein the opening is closer to the broad surface than to any side surface that is at an angle to both, the broad surface and the insertion face.

4. The method according to claim 2, wherein the section of the second object is a board shaped section defining two broad surfaces, the insertion face being a narrow side face between the broad surfaces.

5. The method according to claim 1, wherein the insert portion is asymmetric with respect to rotations of 90° about an insertion axis, whereby the insert portion has a major axis and a minor axis in a plane perpendicular to the insertion axis.

6. The method according to claim 5, wherein the insert portion has a larger extension along the major axis than along the minor axis.

7. The method according to claim 5, wherein the insert portion has a larger stiffness along the major axis than along the minor axis.

8. The method according to claim 5, wherein the insert portion comprises at least one groove running in an axial direction along the insert portion.

9. The method according to claim 8, wherein the insert portion comprises a dividing slit extending from a distal end thereof and dividing the insert portion into at least two portions.

10. The method according to claim 8, comprising the step of causing sections initially separated by the groove or slit to be welded together, preferably during the step of anchoring the insert portion in the opening by transferring energy suitable for liquefaction of the first material.

11. The method according to claim 5, wherein the insert portion has a non-circular hole extending from a distal end thereof and along the central axis of the insert portion.

12. The method according to claim 5, comprising the step of aligning the major axis of the insert portion with the direction of larger strength of the second object prior to the step of transferring the energy, preferably comprising aligning the major axis with the direction of larger strength of the second object prior to inserting the insert portion into the opening.

13. The method according to claim 5, wherein the opening has a circular cross section.

14. The method according to claim 1, wherein the opening has a non-circular cross section and in a plane perpendicular to the opening axis has a larger extension along a direction of smaller strength of the second object than along a direction of larger strength.

15. The method according to claim 1, wherein the opening and the insert portion are adapted to each other for the insert portion to be positioned in the opening with an interference fit along at least a portion of the circumference of the opening.

16. The method according to claim 1, wherein the energy is mechanical energy.

17. The method according to claim 16, wherein the energy is mechanical vibration energy.

18. The method according to claim 17, wherein transferring the energy comprises pressing a vibrating sonotrode against a proximal end face of the first object while the insert portion extends into the opening.

19. The method according to claim 1, and applying a clamping force to the second object while the insert portion is at least partially inserted in the opening, the clamping force acting along a direction of smaller strength of the second object, the clamping force acting in a direction non-parallel to the opening axis.

20. The method according to claim 1, wherein the second object has a plurality of openings, the step of providing the first object comprising providing a corresponding number of first objects, and wherein the step of anchoring the insert portion is carried out for the different first objects simultaneously or in sequence.

21. The method according to claim 1, wherein the second material is one of fibrous, porous, comprising penetrable surface structures, and not able to fully resist penetration on application of pressure.

22. The method according to claim 1, wherein the second material is one of chipboard, wood, fibre board, plywood, particle board and cardboard.

23. The method according to claim 1, wherein the first material comprises a thermoplastic polymer with an elasticity coefficient of at least 0.5 GPa.

24. A machine for carrying out the method according to claim 1, comprising an insertion mechanism capable of inserting the insert portion at least partially in the opening, an anchoring tool capable of transferring the energy suitable for liquefaction of the first material to the first object or the second object, or both, for the anchoring step, wherein the machine is configured and programmed to cause the insertion mechanism to align a major axis of the insert portion with a direction of larger strength of the second object prior to the step of transferring the energy.

25. A joining element for being anchored, with the aid of a thermoplastic material and mechanical vibration, in an object of material penetrable by the liquefied thermoplastic material, the joining element comprising an insert portion for in-depth anchoring in the object, and, proximally of the insert portion, a head portion with a distally facing shoulder between the head portion and the insert portion, the shoulder configured to serve as a stop face when the joining element is anchored in the object, the joining element comprising a thermoplastic material at least on a surface of the insert portion, wherein the insert portion has a larger stiffness along a major axis than along a minor axis perpendicular to the major axis.

26. The joining element according to claim 25, wherein the insert portion comprises at least one groove running in axial direction, the groove having a depth of at least 15% of an average of the insert portion diameter.

27. The joining element according to claim 26, the anchoring portion comprising a plurality of grooves on opposite lateral sides of the shaft, in a staggered arrangement.

28. The joining element according to claim 27, wherein the insert portion, in a section perpendicular to a proximo-distal insert portion axis, has an essentially S-shaped cross section.

29. The joining element according to claim 25, comprising a slit extending from a distal end thereof and dividing the insert portion into at least two portions.

30. The joining element according to claim 25, wherein the insert portion has a non-circular hole extending from a distal end thereof and along a central axis of the insert portion.

31. The joining element according to claim 25, wherein the insert portion has a main body having non-round shape in cross section.

32. The joining element according to claim 31, comprising a plurality of energy directors extending outwardly from the main body.

33. The joining element according to claim 25, wherein the insert portion has a main body and a plurality of energy directors extending outwardly from the main body, wherein the energy directors are inhomogeneously distributed and/or unequal in size.

34. The joining element according to claim 25, wherein the insert portion has a proximal portion and a distal portion, and wherein the condition that the insert portion has a larger stiffness along a major axis than along a minor axis at least holds for the proximal portion.

35. The joining element according to claim 25, wherein the insert portion comprises an insert portion alignment structure for turning the insert portion to a desired position relative to a second object.

\* \* \* \* \*